(12) United States Patent
Lackey et al.

(10) Patent No.: US 9,377,046 B1
(45) Date of Patent: Jun. 28, 2016

(54) FASTENER ASSEMBLY

(71) Applicant: Infinite Technologies, Inc., Folsom, CA (US)

(72) Inventors: Clint J. Lackey, Carson City, NV (US); Casey Aaron Talbot, South Jordan, UT (US); Robert Brian Spencer, Highland, UT (US)

(73) Assignee: Infinite Technologies, Inc., Folsom, CA (US)

( * ) Notice: Subject to any disclaimer, the term of this patent is extended or adjusted under 35 U.S.C. 154(b) by 43 days.

(21) Appl. No.: 14/522,174

(22) Filed: Oct. 23, 2014

Related U.S. Application Data

(60) Provisional application No. 61/993,838, filed on May 15, 2014.

(51) Int. Cl.
*F16B 21/00* (2006.01)
*F16B 37/12* (2006.01)
*B32B 38/00* (2006.01)

(52) U.S. Cl.
CPC ............... *F16B 37/122* (2013.01); *B32B 38/00* (2013.01); *B32B 2038/0052* (2013.01)

(58) Field of Classification Search
CPC ............ F16B 5/00; F16B 5/01; F16B 5/0275; F16B 5/0004; F16B 11/008; F16B 37/122; F16B 37/125; F16B 37/145; F16B 21/00
USPC .................... 411/82–82.1, 337, 338
See application file for complete search history.

(56) References Cited

U.S. PATENT DOCUMENTS

| | | | | |
|---|---|---|---|---|
| 3,356,404 A | * | 12/1967 | Peters | F16B 5/02 403/408.1 |
| 3,462,114 A | * | 8/1969 | O'Dell, Jr. | E04G 17/02 249/191 |
| 4,033,243 A | * | 7/1977 | Kirrish | F16B 37/145 411/338 |
| 4,310,273 A | * | 1/1982 | Kirrish | F16B 5/0233 411/338 |
| 5,244,326 A | * | 9/1993 | Henriksen | F16B 37/145 411/180 |
| 5,304,023 A | * | 4/1994 | Toback | F16B 33/004 411/387.3 |
| 5,620,287 A | * | 4/1997 | Pratt | F16B 5/01 411/361 |
| 5,888,012 A | * | 3/1999 | Nygren, Jr. | F16B 5/0225 403/13 |
| 5,891,115 A | * | 4/1999 | Hauer | A63C 17/22 301/111.01 |
| 6,012,763 A | * | 1/2000 | Clemente | B60J 5/108 296/146.11 |

(Continued)

OTHER PUBLICATIONS

Fairchild Fasteners, "Panel Fasteners," product brochure, 2001.

(Continued)

*Primary Examiner* — Roberta Delisle
(74) *Attorney, Agent, or Firm* — Stites & Harbison, PLLC; David W. Nagle, Jr.; James R. Hayne

(57) ABSTRACT

A fastener assembly is provided that includes a female insert having a head and a sleeve which extends from the head. The head of the female insert abuts a first panel, with the sleeve extending through a first preformed hole in the first panel. The distal end of the sleeve thus protrudes from the first preformed hole of the first panel and is then crimped around a washer to mechanically connect the female insert to the first panel. The female insert may also include one or more adhesive receptacles to further adhere the female insert to the first panel. A second panel with a second preformed hole is aligned with the first panel, and a male fastener having a base and a shank that extends from the base is inserted through the second preformed hole and into the female insert to connect the first panel and the second panel.

25 Claims, 4 Drawing Sheets

(56) References Cited

U.S. PATENT DOCUMENTS

| | | | | |
|---|---|---|---|---|
| 6,264,412 | B1* | 7/2001 | Nakamura | F16B 5/01 411/107 |
| 7,555,818 | B2* | 7/2009 | Erskine | E04F 13/0835 24/305 |
| 2006/0182513 | A1* | 8/2006 | Dortch | F16B 23/0061 411/338 |
| 2012/0263557 | A1* | 10/2012 | Spencer | B30R 13/105 411/366.1 |
| 2013/0097848 | A1* | 4/2013 | Inaba | F16B 5/02 29/525.06 |

OTHER PUBLICATIONS

Anemo Engineering Bvba, "Camlock Quick-Operating Fasteners," product catalog, Feb. 2008.

* cited by examiner

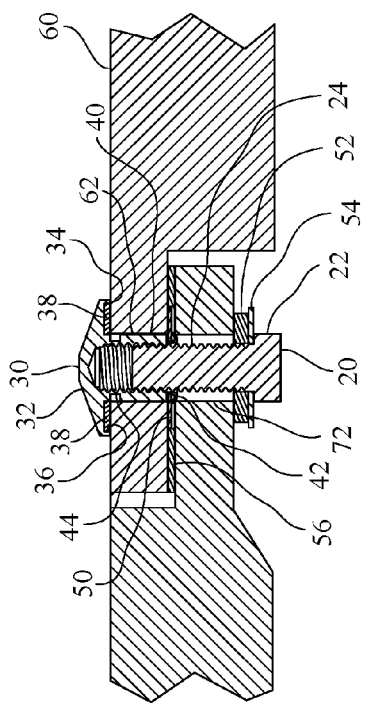
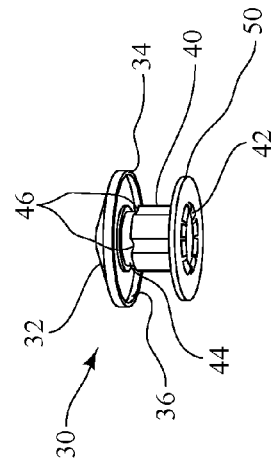
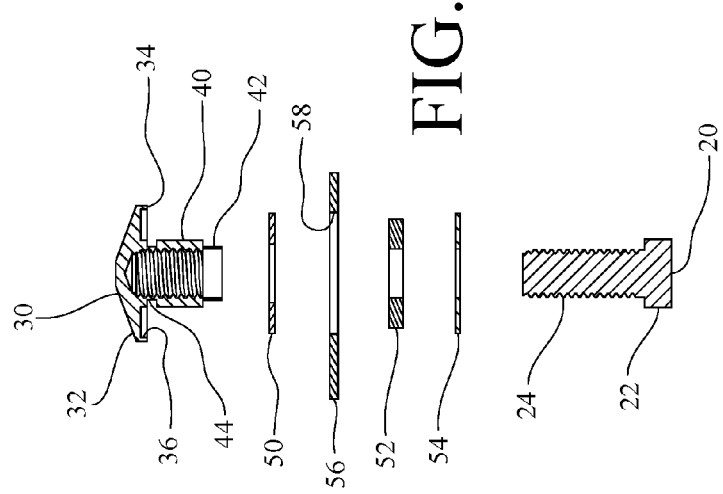
FIG. 3
FIG. 6
FIG. 4

FASTENER ASSEMBLY

CROSS-REFERENCE TO RELATED APPLICATIONS

The present application claims priority to U.S. Provisional Patent Application Ser. No. 61/993,838 filed on May 15, 2014, the entire disclosure of which is incorporated herein by reference.

STATEMENT REGARDING FEDERALLY SPONSORED RESEARCH OR DEVELOPMENT

This invention was made with government support under Contract No. FA8222-12-C-0007 awarded by the United States Air Force. The government has certain rights in the invention.

BACKGROUND OF THE INVENTION

A radome is an enclosure designed to protect radar antennas from outside weather and debris. A typical ground-based radome is constructed of a multitude of panels formed into a spherical enclosure. Each of the panels is connected by a plurality of fasteners, such that a typical 55-foot diameter radome may have more than 6,000 fasteners. By some estimates, each fastener takes about a minute to install, leading to over 100 man-hours for fastener installation alone in a typical 55-foot diameter radome.

In current installations, radome panels are often connected by a common nut-and-bolt fastener. A nut-and-bolt fastener requires a user to secure either the nut or the bolthead in place while tightening the other. In other words, access to both portions of the fastener (i.e., both sides of the joined radome panels) is necessary.

In some situations, an adhesive is applied to the nut portion of the fastener to hold it in place while the bolt is tightened. However, such an adhesive can be weak and may not hold during the installation process, and the adhesive bond often does not last throughout the operational life of the fastener. If the adhesive bond on the nut is broken, the fastener may merely spin in place rather than tighten. At the same time, with the nut and bolt on opposite sides of the joined radome panels, simultaneous access to both portions of the fastener is not readily available.

Thus, there remains a need for an improved fastener assembly which can be quickly installed and requires access to only one side of the adjacent radome panels.

SUMMARY OF THE INVENTION

The present invention is a fastener assembly that has particular applicability and utility in the installation of radome panels.

The fastener assembly of the present invention is comprised of a female insert that is inserted into a first preformed hole of a first panel and a male fastener inserted into a second preformed hole of a second panel and then into the female insert, such that the first and second panels are joined by the installed fastener assembly.

The female insert is comprised of a head defining a bottom surface and a sleeve that extends from a central portion of the bottom surface of the head and terminates in a distal end. The female insert further includes internal threads, as further discussed below. The female insert is configured for connection to the first panel such that the bottom surface of the head of the female insert abuts the first panel, with the sleeve extending through the first preformed hole. The distal end of the sleeve thus protrudes from the first preformed hole of the first panel. An interior washer is positioned around the distal end of the sleeve of the female insert such that the interior washer is adjacent to the first panel opposite the head of the female insert and the distal end of the sleeve is crimped over the interior washer to mechanically connect the female insert to the first panel.

To further improve the connection between the female insert and the first panel, in some embodiments: the bottom surface of the head of the female insert defines an annular cavity that circumscribes the sleeve; the sleeve of the female insert defines a collar groove in its external surface that extends around the perimeter of the sleeve near the bottom surface of the head of the female insert; and/or the sleeve of the female insert further defines one or more longitudinal grooves in its external surface that extend from the bottom surface of the head of the female insert longitudinally along the external surface of the sleeve. In use, an adhesive is received in the annular cavity, the collar groove, and/or the one or more longitudinal grooves to better adhere the female insert to the first panel.

In some embodiments, the fastener assembly further includes a panel gasket positioned around the interior washer and adjacent to the first and second panels. The panel gasket allows for a secure connection between the first and second panels without pressing the crimped distal end of the sleeve of the female insert or the interior washer into the upper surface of the second panel. Furthermore, it is contemplated that the panel gasket provides a substantially watertight seal between the first and second panels. Of course, the first and second panels are joined by a plurality of fastener assemblies, and so, the panel gasket is configured to run substantially the entire length of the connection between the first and second panels with the panel gasket defining a plurality of holes that correspond to the position of the plurality of fastener assemblies.

The male fastener of the fastener assembly is comprised of a base and a threaded shank that extends from the base. Thus, in at least some embodiments, the male fastener is a typical bolt with the threaded shank of the male fastener configured to be inserted through the second preformed hole of the second panel and into the female insert, such that, the threaded shank engages the internal threads of the female insert. Furthermore, in some embodiments, a fastener gasket is positioned around the threaded shank of the male fastener and adjacent to the base of the male fastener with a base washer positioned around the threaded shank of the male fastener and between the fastener gasket and the base of the male fastener. The fastener gasket has an outer diameter that is larger than the diameter of the second preformed hole of the second panel, such that, when the fastener assembly is installed, the fastener gasket is compressed between the bottom surface of the second panel and the base of the male fastener. Advantageously, when the fastener gasket is compressed, it provides a biasing force on the base of the male fastener to pre-load the fastener assembly to ensure a secure connection between the two panels.

Although the fastener assembly has particular applicability and utility in the installation of radome panels, the fastener assembly could also be used to connect any objects having suitable geometries.

DESCRIPTION OF THE DRAWINGS

FIG. 3 is a side sectional view of one of the exemplary fastener assemblies of FIG. 1 taken along line 3-3 of FIG. 1;

FIG. 4 is an exploded side sectional view of the fastener assembly of FIG. 3;

FIG. 6 is a bottom perspective view of one of the female inserts and interior washers of FIG. 5 shown in isolation.

DETAILED DESCRIPTION OF THE INVENTION

The present invention is a fastener assembly that has particular applicability and utility in the installation of radome panels.

Figure 1:
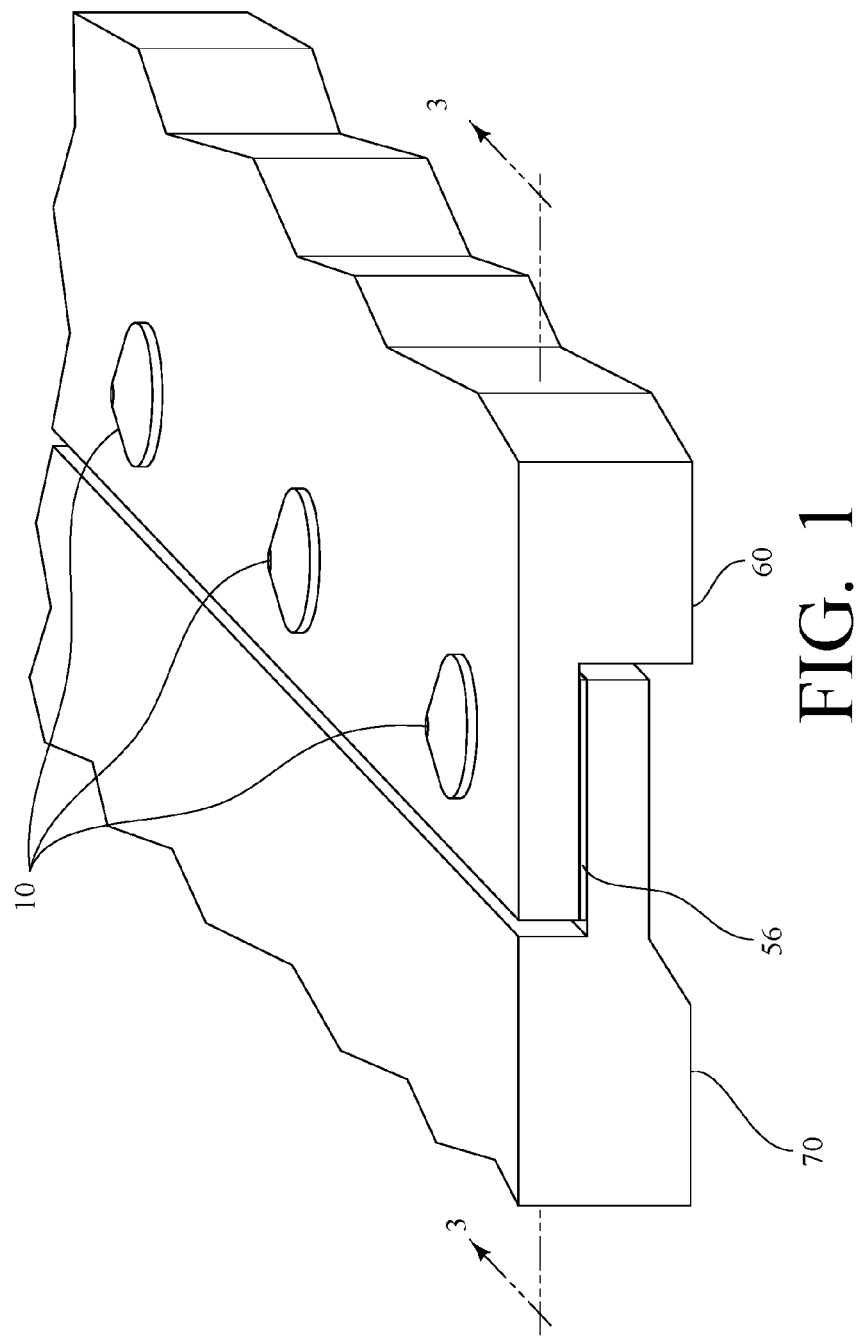
FIG. 1 is a perspective view of a plurality of exemplary fastener assemblies made in accordance with the present invention shown joining a first (overlap) panel and an second (underlap) panel.

Referring first to FIGS. 1 and 3, a plurality of exemplary fastener assemblies 10 made in accordance with the present invention are installed to join a first (overlap) panel 60 and a second (underlap) panel 70 of a radome. The first panel 60 defines a first preformed hole 62, and the second panel 70 defines a second preformed hole 72 that is aligned with the first preformed hole 62 of the first panel 60. The fastener assembly 10 is comprised of a female insert 30 that is inserted into the first preformed hole 62 of the first panel 60 and a male fastener 20 that is inserted into the second preformed hole 72 of the second panel 70 and then into the female insert 30, such that the first and second panels 60, 70 are joined by the installed fastener assembly 10.

Figure 2:
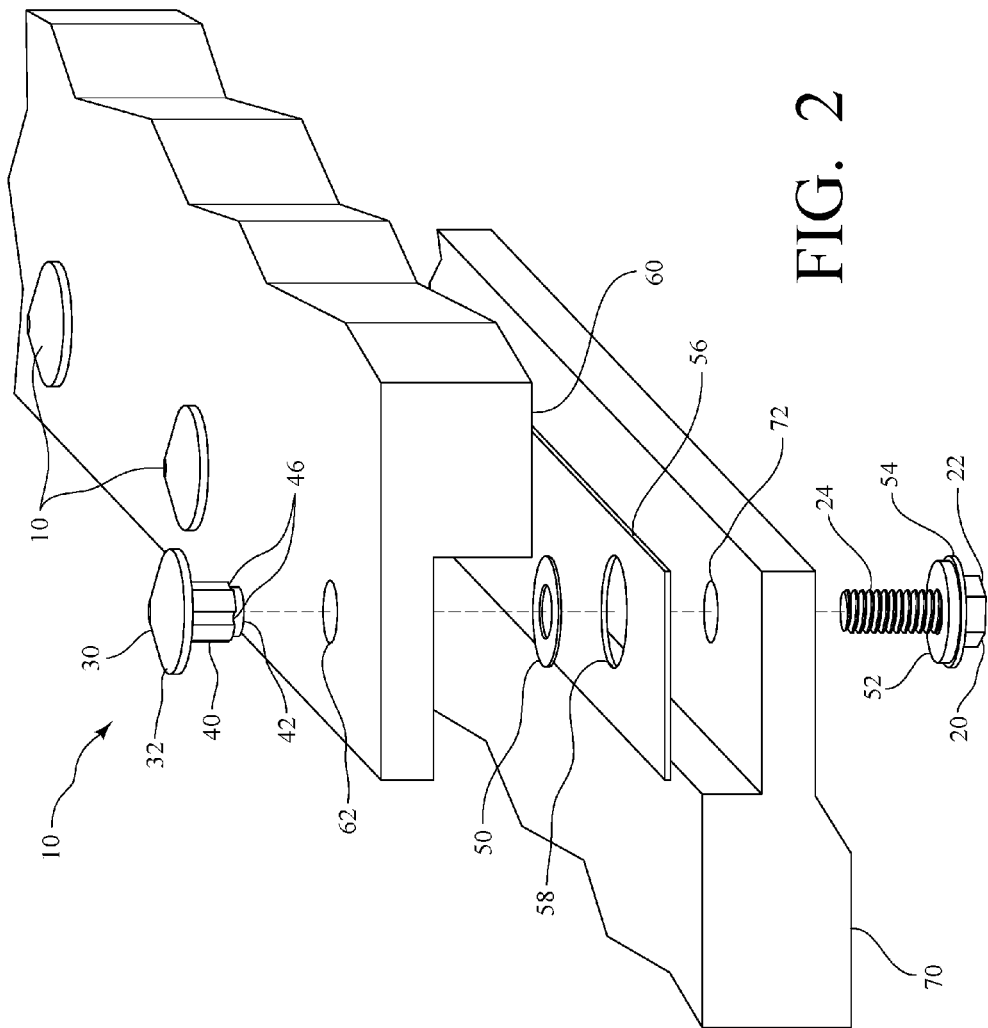
FIG. 2 is an exploded perspective view of one of the exemplary fastener assemblies of FIG. 1 prior to installation.

Referring now to FIGS. 2-4, the female insert 30 is comprised of a head 32 defining a bottom surface 34 and a sleeve 40 that extends from a central portion of the bottom surface 34 of the head 32 and terminates in a distal end 42. The female insert 30 further includes internal threads, as further discussed below. The female insert 30 is configured for connection to the first panel 60 with the sleeve 40 of the female insert 30 inserted into the first preformed hole 62 of the first panel 60. Specifically, the female insert 30 is configured such that the bottom surface 34 of the head 32 of the female insert 30 abuts the first panel 60, with the sleeve 42 extending through the first preformed hole 62. The distal end 42 of the sleeve 40 thus protrudes from the first preformed hole 62 of the first panel 60.

As perhaps best shown in FIG. 3, an interior washer 50 is positioned around the distal end 42 of the sleeve 40 of the female insert 30, such that the interior washer 50 is adjacent to the first panel 60 opposite the head 32 of the female insert 30. Then, as shown in FIG. 3, the distal end 42 of the sleeve 40 is crimped over the interior washer 50 to mechanically connect the female insert 30 to the first panel 60. However, as shown in FIGS. 2 and 4, the distal end 42 of the sleeve 40 is straight (or not crimped) prior to the female insert 30 being connected to the first panel 60, as further discussed below.

Referring now to FIG. 6, in addition to the mechanical connection of the female insert 30 to the first panel 60 provided by crimping the distal end 42 of the sleeve 40 over the interior washer 50, it is contemplated that an adhesive is also applied to the female insert 30 prior to connection to the first panel 60 in order to securely connect the female insert 30 to the first panel 60. To increase the adhesion between the female insert 30 and the first panel 60, the female insert 30 of the present invention includes one or more adhesive receptacles. In some exemplary embodiments, and as shown in FIGS. 2-4 and 6, the bottom surface 34 of the head 32 of the female insert 30 defines an annular cavity 36 that circumscribes the sleeve 40, such that, in use, the adhesive (as indicated by reference number 38 in FIG. 3) is received in the annular cavity 36 defined in the bottom surface 34 of the head 32 of the female insert 30. The adhesive received in the annular cavity 36 thus adheres the head 32 of the female insert 30 to the first panel 60.

Furthermore, in some exemplary embodiments of the present invention and as also shown in FIGS. 2-4 and 6, the sleeve 40 of the female insert 30 defines a collar groove 44 in its external surface. The collar groove 44 extends around the perimeter of the sleeve 40 near the bottom surface 34 of the head 32 of the female insert 30. In this way, the collar groove 44 is in fluid communication with the annular cavity 36 defined in the bottom surface 34 of the head 32 of the female insert 30, such that, in use, adhesive is received in both the annular cavity 36 (as indicated by reference number 38 in FIG. 3) and the collar groove 44. The adhesive received in the collar groove 44 thus adheres the sleeve 40 of the female insert 30 to the interior of the first preformed hole 62 of the first panel 60.

Furthermore, in some exemplary embodiments of the present invention and as also shown in FIGS. 2-4 and 6, the sleeve 40 of the female insert 30 defines one or more longitudinal grooves 46 in its external surface. The one or more longitudinal grooves 46 extend from the bottom surface 34 of the head 32 of the female insert 30 longitudinally along the external surface of the sleeve 40. In this way, the one or more longitudinal grooves 46 are in fluid communication with both the annular cavity 36 defined in the bottom surface 34 of the head 32 of the female insert 30 and the collar groove 44 defined in the external surface of the sleeve 40 of the female insert 30, such that, in use, adhesive is received in the annular cavity 36 (as indicated by reference number 38 in FIG. 3), the collar groove 44, and the one or more longitudinal grooves 46. The adhesive received in the one or more longitudinal grooves 46 thus further adheres the sleeve 40 of the female insert 30 to the interior of the first preformed hole 62 of the first panel 60.

Thus, in the exemplary embodiment shown in FIGS. 2-4 and 6, the female insert 30 is adhered to the first panel 60 by adhesive in all three of the adhesive receptacles: the annular cavity 36, the collar groove 44, and the one or more longitudinal grooves 46. However, it is contemplated that the fastener assembly need not include all three of the adhesive receptacles. In some embodiments, the fastener assembly may include only one, or any combination of two of the above adhesive receptacles. In other embodiments, the fastener assembly may not have any of the above adhesive receptacles, but instead rely solely on the mechanical connection provided by crimping the distal end of the sleeve of the female insert over the interior washer to securely connect the female insert to the first panel.

Aside from connecting the female insert 30 to the first panel 60, it is contemplated that the adhesive provides a substantially watertight seal that prevents water from seeping between the female insert 30 and the first panel 60. Furthermore, in the exemplary fastener assembly 10, the female insert 30 is connected to the first panel 60 in a manner which prevents the female insert 30 from rotating within the first preformed hole 62 of the first panel 60 during installation as well as throughout the operational life of the fastener assembly, as further discussed below.

As perhaps best shown in FIGS. 3-4, the exemplary fastener assembly 10 of the present invention further includes a panel gasket 56 positioned around the interior washer 50 and adjacent to the first and second panels 60, 70. The panel gasket 56 allows for a secure connection between the first and second panels 60, 70 without pressing the crimped distal end 42 of the sleeve 40 of the female insert 30 or the interior washer 50 into the upper surface of the second panel 70. Furthermore, it is contemplated that the panel gasket 56 provides a substantially watertight seal between the first and second panels 60, 70.

Figure 5:
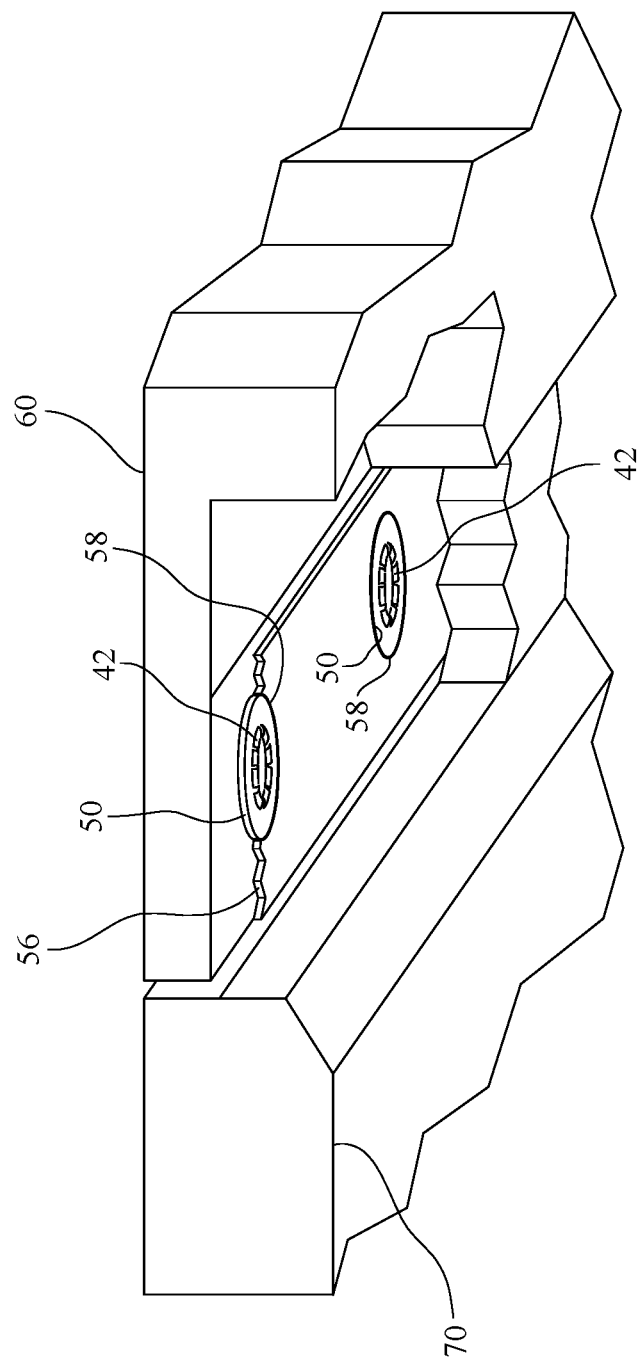
FIG. 5 is a partial and cutaway bottom perspective view of a plurality of female inserts and interior washers of the exemplary fastener assembly shown mechanically connected to the first panel with the panel gasket positioned around the interior washers and adjacent to the first panel.

As shown in FIGS. 1 and 5, the first panel 60 and the second panel 70 are joined by a plurality of fastener assemblies 10. To this end, and referring specifically to FIG. 5, the panel gasket 56 is configured to run substantially the entire length of the connection between the first and second panels 60, 70, with the panel gasket 56 defining a plurality of holes 58 that correspond to the position of the plurality of fastener assemblies 10.

Referring now to FIGS. 3 and 4, the male fastener 20 of the exemplary fastener assembly 10 is comprised of a base 22 and a threaded shank 24 that extends from the base 22. Thus, in at least some embodiments, the male fastener 20 is a typical bolt. The threaded shank 24 of the male fastener 20 is configured to be inserted through the second preformed hole 72 of the second panel 70 and into the female insert 30, such that, the threaded shank 24 engages the internal threads of the female insert 30.

Referring still to FIGS. 3 and 4, the exemplary fastener assembly 10 further includes a fastener gasket 52 positioned around the threaded shank 24 of the male fastener 20 and adjacent to the base 22 of the male fastener 20. Furthermore, the fastener assembly 10 also includes a base washer 54 positioned around the threaded shank 24 of the male fastener 20 and between the fastener gasket 52 and the base 22 of the male fastener 20. The fastener gasket 52 has an outer diameter that is larger than the diameter of the second preformed hole 72 of the second panel 70 such that when the fastener assembly 10 is installed, the fastener gasket 52 is compressed between the bottom surface of the second panel 70 and the base 22 of the male fastener 20. Advantageously, when the fastener gasket 52 is compressed, it provides a biasing force on the base 22 of the male fastener 20 to pre-load the fastener assembly 10 to ensure a secure connection between the two panels 60, 70. Furthermore, it is contemplated that the fastener gasket 52 provides a substantially watertight seal between the first panel 60 and the base 22 of the male fastener 20.

Referring now to FIG. 2, in an exemplary method of installing the fastener assembly 10 to join the first and second panels 60, 70, a first panel 60 with a first preformed hole 62 is provided. A female insert 30 is provided that has a sleeve 40 with a straight distal end 42 (i.e., the distal end 42 has not yet been crimped around the interior washer 50). An adhesive is applied to the female insert 30 to completely fill the annular cavity 36 (FIGS. 3-4 and 6) defined in the bottom surface 34 of the head 32 of the female insert 30, in the collar groove 44 (FIGS. 3-4 and 6) defined in the external surface of the sleeve 40 of the female insert 30, and in the one or more longitudinal grooves 46 (FIGS. 2 and 6) defined in the external surface of the sleeve 40. The sleeve 40 of the female insert 30 is then inserted into the first preformed hole 62 of the first panel 60 such that the head 32 of the female insert 30 abuts the first panel 60, and the distal end 42 of the sleeve 40 protrudes from the first preformed hole 62 of the first panel 60. An interior washer 50 is then positioned around the distal end 42 of the sleeve 40 of the female insert 30 and the distal end 42 is crimped over the interior washer 50 to mechanically connect the female insert 30 to the first panel 60 (as shown, for example, in FIGS. 3 and 6).

In some exemplary methods of the present invention, the subsequent steps are performed immediately after mechanically connecting the female insert 30 to the first panel 60; however, in some other exemplary methods, the adhesive is allowed to set before the subsequent steps are performed, providing both a mechanical and adhesive connection between the female insert 30 and the first panel 60. Furthermore, in some particular embodiments, the female insert 30 is connected to the first panel 60 as part of the manufacturing process of the first panel 60. Regardless of the time between connecting the female insert 30 to the first panel 60 and the subsequent steps, the connection between the female insert 30 and the first panel 60 is of sufficient strength to prevent the female insert 30 from rotating within the first preformed hole 62 of the first panel 60 during the remaining installation steps.

Referring still to FIG. 2, a second panel 70 with a second preformed hole 72 is now provided and positioned adjacent to the first panel 60 such that the first preformed hole 62 of the first panel 60 is aligned with the second preformed hole 72 of the second panel 70. A panel gasket 56 is positioned between the first and second panels 60, 70, such that a hole 58 defined by the panel gasket 56 is also aligned with the first and second preformed holes 62, 72, and the panel gasket 56 surrounds the interior washer 50.

Referring still to FIG. 2, a male fastener 20 is now provided with a fastener gasket 52 and a base washer 54 positioned around the threaded shank 24 of the male fastener 20, and the threaded shank 24 of the male fastener 20 is inserted through the second preformed hole 72 of the second panel 70 and into the sleeve 40 of the female insert 30, such that the fastener gasket 52 is between the second panel 70 and the base washer 54, and the base washer 54 is between the fastener gasket 52 and the base 22 of the male fastener 20. The base 22 of the male fastener 20 is rotated which causes the threads of the threaded shank 24 of the male fastener 20 to engage the internal threads of the female insert 30 and advance the threaded shank 24 of the male fastener 20 into the female insert 30. As described above, the connection between the female insert 30 and the first panel 60 is of sufficient strength to prevent the female insert 30 from rotating within the first preformed hole 62 of the first panel 60 as the base 22 of the male fastener 20 is rotated. Since the female insert does not rotate, access to both sides of the panels 60, 70 is not necessary during installation or later maintenance of the fastener assembly 10. Accordingly, only one tool (i.e., a nut driver, wrench, or other means of screwing and unscrewing the male fastener 20) is required.

As the threaded shank 24 of the male fastener 20 advances into the female insert 30, the fastener gasket 52 is compressed between the second panel 70 and the base 22 of the male fastener 20, and provides a biasing force on the base 22 of the male fastener 20 to pre-load the fastener assembly 10. Accordingly, the base 22 of the male fastener 20 is rotated until a predetermined pre-loaded force is achieved.

As a further refinement, in this exemplary embodiment and as shown in FIGS. 1-6, the head 32 of the female insert 30 tapers in thickness from the center to the edge of the head 32. This exemplary shape advantageously provides a large bonding surface with the first panel 60 while maintaining a low profile. The low profile of the tapered head 32 of the female insert 30 allows the exterior of the first and second panels 60, 70 to be more easily cleaned. Specifically, snow and debris are less likely to collect on the exterior of the first panel 60 around the tapered head 32 of the female insert 30, and any snow and debris which does collect on the first panel 60 will be easier to remove.

Although the above-described fastener assembly 10 has particular applicability and utility in the installation of radome panels, the fastener assembly 10 could also be used to connect any objects having suitable geometries without departing from the spirit and scope of the present invention.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A fastener assembly, comprising:
   a male fastener having a base and a shank that extends from the base; and
   a female insert having a head defining a bottom surface, along with a sleeve which extends from a central portion of the bottom surface of the head, the bottom surface of the head defining an annular cavity that circumscribes the sleeve;
   wherein the sleeve of the female insert is configured for insertion into a preformed hole of a first panel, such that, in use, (i) the head of the female insert abuts the first panel, and (ii) an adhesive is received in the annular cavity defined in the bottom surface of the head of the female insert for securely connecting the female insert to the first panel;
   wherein the male fastener is configured for insertion through a preformed hole of a second panel and then into the sleeve of the female insert to join the first panel and the second panel; and
   wherein the sleeve of the female insert defines a collar groove in its external surface, and wherein the collar groove is in fluid communication with the annular cavity defined in the bottom surface of the head of the female insert, such that, in use, the adhesive is received in both the annular cavity and the collar groove for securely connecting the female insert to the first panel.

2. The fastener assembly as recited in claim 1, wherein the sleeve of the female insert further defines one or more longitudinal grooves in its external surface, and wherein the one or more longitudinal grooves are in fluid communication with both the annular cavity defined in the bottom surface of the head and the collar groove defined in the external surface of the sleeve of the female insert, such that, in use, the adhesive is received in the annular cavity, the collar groove, and the one or more longitudinal grooves for securely connecting the female insert to the first panel.

3. A fastener assembly, comprising:
   a male fastener having a base and a shank that extends from the base; and
   a female insert having a head defining a bottom surface, along with a sleeve which extends from a central portion of the bottom surface of the head, the bottom surface of the head defining an annular cavity that circumscribes the sleeve;
   wherein the sleeve of the female insert is configured for insertion into a preformed hole of a first panel, such that, in use, (i) the head of the female insert abuts the first panel, and (ii) an adhesive is received in the annular cavity defined in the bottom surface of the head of the female insert for securely connecting the female insert to the first panel;
   wherein the male fastener is configured for insertion through a preformed hole of a second panel and then into the sleeve of the female insert to join the first panel and the second panel; and
   wherein the sleeve of the female insert defines one or more longitudinal grooves in its external surface, and wherein the one or more longitudinal grooves is in fluid communication with the annular cavity defined in the bottom surface of the head, such that, in use, the adhesive is received in both the annular cavity and the one or more longitudinal grooves for securely connecting the female insert to the first panel.

4. A fastener assembly, comprising:
   a male fastener having a base and a shank that extends from the base;
   a female insert having a head defining a bottom surface, along with a sleeve which extends from a central portion of the bottom surface of the head, the bottom surface of the head defining an annular cavity that circumscribes the sleeve;
   an adhesive; and
   a fastener gasket positioned around the shank of the male fastener and adjacent to the base of the male fastener;
   wherein the sleeve of the female insert is configured for insertion into a preformed hole of a first panel, such that, in use, (i) the head of the female insert abuts the first panel, and (ii) the adhesive is received in the annular cavity defined in the bottom surface of the head of the female insert, thus adhering and securely connecting the female insert to the first panel and substantially preventing the female insert from rotating within the preformed hole of the first panel,
   wherein the male fastener is configured for insertion through a preformed hole of a second panel and then into the sleeve of the female insert to join the first panel and the second panel, and
   wherein, in use, the fastener gasket is compressed and applies a biasing force on the base of the male fastener to pre-load the fastener assembly when the first panel and the second panel are joined.

5. The fastener assembly as recited in claim 4, and further comprising a base washer positioned around the shank of the male fastener and between the fastener gasket and the base of the male fastener.

6. A fastener assembly, comprising:
   a male fastener having a base and a shank that extends from the base,
   a female insert having a head defining a bottom surface, along with a sleeve which extends from a central portion of the bottom surface of the head, the bottom surface of the head defining an annular cavity that circumscribes the sleeve,
   an adhesive, and
   a panel gasket;
   wherein the sleeve of the female insert is configured for insertion into a preformed hole of a first panel, such that, in use, (i) the head of the female insert abuts the first panel, and (ii) the adhesive is received in the annular cavity defined in the bottom surface of the head of the female insert, thus adhering and securely connecting the female insert to the first panel and substantially preventing the female insert from rotating within the preformed hole of the first panel;

wherein the male fastener is configured for insertion through a preformed hole of a second panel and then into the sleeve of the female insert to join the first panel and the second panel; and wherein, in use, the panel gasket is positioned between and adjacent to the first panel and the second panel to provide a watertight seal between the first panel and the second panel.

7. A fastener assembly, comprising:

a male fastener having a base and a shank that extends from the base;

a female insert having a head defining a bottom surface, along with a sleeve which extends from a central portion of the bottom surface of the head, the bottom surface of the head defining an annular cavity that circumscribes the sleeve;

an adhesive; and an interior washer;

wherein the sleeve of the female insert is configured for insertion into a preformed hole of a first panel, such that, in use, (i) the head of the female insert abuts the first panel, and (ii) the adhesive is received in the annular cavity defined in the bottom surface of the head of the female insert, thus adhering and securely connecting the female insert to the first panel and substantially preventing the female insert from rotating within the preformed hole of the first panel;

wherein the male fastener is configured for insertion through a preformed hole of a second panel and then into the sleeve of the female insert to join the first panel and the second panel; and wherein, such that, in use, (i) a distal end of the sleeve of the female insert is protruding from the preformed hole of the first panel, (ii) the interior washer is positioned around the distal end of the sleeve of the female insert, and (iii) the distal end of the sleeve of the female insert is crimped over the interior washer to mechanically connect the female insert to the first panel.

8. The fastener assembly as recited in claim 7, and further comprising a panel gasket, such that, in use, the panel gasket is positioned around the interior washer between and adjacent to the first panel and the second panel to provide a watertight seal between the first panel and the second panel.

9. A fastener assembly, comprising:

a male fastener having a base and a shank that extends from the base;

a female insert having a tapered head defining a bottom surface, along with a sleeve which extends from a central portion of the bottom surface of the tapered head; and a washer;

wherein the sleeve of the female insert is configured for insertion into a preformed hole of a first panel, such that, in use, the bottom surface of the tapered head of the female insert abuts the first panel, with a distal end of the sleeve of the female insert protruding from the preformed hole of the first panel, and the washer positioned around the distal end of the sleeve of the female insert;

wherein the distal end of the sleeve of the female insert is crimped over the washer to mechanically connect the female insert to the first panel; and wherein the male fastener is configured for insertion through a preformed hole of a second panel and then into the sleeve of the female insert to join the first panel and the second panel.

10. A fastener insert, comprising:

a head having a bottom surface; and a sleeve which extends from a central portion of the bottom surface of the head, the sleeve configured for insertion into a preformed hole of a panel, such that, in use, the bottom surface of the head abuts the panel;

wherein the bottom surface of the head defines an annular cavity that circumscribes the sleeve, such that, in use, an adhesive is received in the annular cavity for securely connecting the fastener insert to the panel; and wherein the sleeve is configured to extend through the preformed hole of the panel with a distal end of the sleeve protruding from the preformed hole of the panel, such that, in use, the fastener insert is mechanically connected to the panel by crimping the distal end of the sleeve over a washer positioned around the distal end of the sleeve.

11. The fastener insert as recited in claim 10, wherein the sleeve defines a collar groove in its external surface, and wherein the collar groove is in fluid communication with the annular cavity defined in the bottom surface of the head, such that, in use, the adhesive is received in both the annular cavity and the collar groove for securely connecting the fastener insert to the panel.

12. The fastener insert as recited in claim 11, wherein the sleeve further defines one or more longitudinal grooves in its external surface, and wherein the one or more longitudinal grooves are in fluid communication with both the annular cavity defined in the bottom surface of the head and the collar groove defined in the external surface of the sleeve, such that, in use, the adhesive is received in the annular cavity, the collar groove, and the one or more longitudinal grooves for securely connecting the fastener insert to the panel.

13. The fastener insert as recited in claim 10, wherein the sleeve defines one or more longitudinal grooves in its external surface, and wherein the one or more longitudinal grooves are in fluid communication with the annular cavity defined in the bottom surface of the head, such that, in use, the adhesive is received in both the annular cavity and the one or more longitudinal grooves for securely connecting the fastener insert to the panel.

14. A fastener insert, comprising:

a head having a bottom surface; and a sleeve which extends from a central portion of the bottom surface of the head, the sleeve configured for insertion into a preformed hole of a panel such that the bottom surface of the head abuts the panel;

wherein the sleeve defines a collar groove in its external surface, such that, in use, an adhesive is received in the collar groove for securely connecting the fastener insert to the panel.

15. The fastener insert as recited in claim 14, wherein the sleeve further defines one or more longitudinal grooves in its external surface, and wherein the one or more longitudinal grooves are in fluid communication with the collar groove defined in the external surface of the sleeve, such that, in use, the adhesive is received in both the collar groove and the one or more longitudinal grooves for securely connecting the fastener insert to the panel.

16. The fastener insert as recited in claim 15, wherein the bottom surface of the head defines an annular cavity that circumscribes the sleeve and is in fluid communication with both the collar groove and the one or more longitudinal grooves defined in the external surface of the sleeve, such that, in use, the adhesive is received in the collar groove, the one or more longitudinal grooves, and the annular cavity for securely connecting the fastener insert to the panel.

17. The fastener insert as recited in claim 14, wherein the bottom surface of the head defines an annular cavity that circumscribes the sleeve and is in fluid communication with the collar groove defined in the external surface of the sleeve, such that, in use, the adhesive is received in both the collar groove and the annular cavity for securely connecting the fastener insert to the panel.

18. The fastener insert as recited in claim 14, wherein the sleeve is configured to extend through the preformed hole of the panel with a distal end of the sleeve protruding from the preformed hole of the panel, such that, in use, the fastener insert is mechanically connected to the panel by crimping the distal end of the sleeve over a washer positioned around the distal end of the sleeve.

19. A fastener insert, comprising:
   a head having a bottom surface; and
   a sleeve which extends from a central portion of the bottom surface of the head, the sleeve configured for insertion into a preformed hole of a panel such that the bottom surface of the head abuts the panel;
   wherein the sleeve defines one or more longitudinal grooves in its external surface, such that, in use, an adhesive is received in the one or more longitudinal grooves for securely connecting the fastener insert to the panel.

20. The fastener insert as recited in claim 19, wherein the sleeve further defines a collar groove in its external surface, and wherein the collar groove is in fluid communication with the one or more longitudinal grooves defined in the external surface of the sleeve, such that, in use, the adhesive is received in the both the one or more longitudinal grooves and the collar groove for securely connecting the fastener insert to the panel.

21. The fastener insert as recited in claim 20, wherein the bottom surface of the head defines an annular cavity that circumscribes the sleeve and is in fluid communication with both the one or more longitudinal grooves and the collar groove defined in the external surface of the sleeve, such that, in use, the adhesive is received in the one or more longitudinal grooves, the collar groove, and the annular cavity for securely connecting the fastener insert to the panel.

22. The fastener insert as recited in claim 19, wherein the bottom surface of the head defines an annular cavity that circumscribes the sleeve and is in fluid communication with the one or more longitudinal grooves defined in the external surface of the sleeve, such that, in use, the adhesive is received in the both the one or more longitudinal grooves and the annular cavity for securely connecting the fastener insert to the panel.

23. The fastener insert as recited in claim 19, wherein the sleeve is configured to extend through the preformed hole of the panel with a distal end of the sleeve protruding from the preformed hole of the panel, such that, in use, the fastener insert is mechanically connected to the panel by crimping the distal end of the sleeve over a washer positioned around the distal end of the sleeve.

24. A method of installing a fastener assembly to join a first panel and a second panel comprising the steps of:
   providing the first panel with a first preformed hole;
   providing the second panel with a second preformed hole;
   aligning the first preformed hole of the first panel with the second preformed hole of the second panel;
   providing a female insert having a head defining a bottom surface, along with a sleeve which extends from a central portion of the bottom surface of the head;
   inserting the female insert into the preformed hole of the first panel, such that the head of the female insert abuts the first panel and a distal end of the sleeve of the female insert protrudes from the preformed hole of the first panel;
   positioning a washer around the distal end of the sleeve of the female insert;
   crimping the distal end of the sleeve of the female insert over the washer to mechanically connect the female insert to the first panel;
   providing a male fastener having a base and a shank that extends from the base; and
   inserting the shank of the male fastener through the second preformed hole of the second panel and then into the sleeve of the female insert.

25. The method as recited in claim 24, wherein, the bottom surface of the head defines an annular cavity that circumscribes the sleeve, and wherein, prior to the step of inserting the female insert into the preformed hole of the first panel, the method further comprises a step of applying adhesive to the female insert, such that, the adhesive is received in the annular cavity.

* * * * *